T. J. Sloan,
Shutter Worker.
No. 80,023. Patented July 14, 1868.
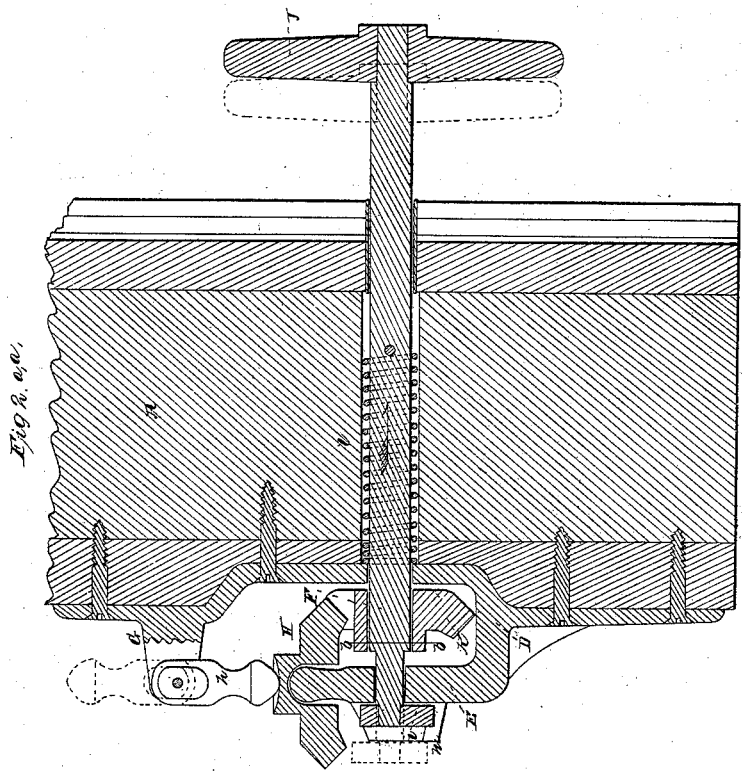
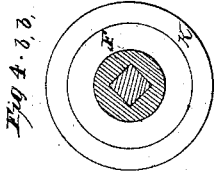
Witnesses.
Wm H Bishop
A DeLacy
Inventor.
Thos J Sloan T. J. Sloan,
Shutter Worker.

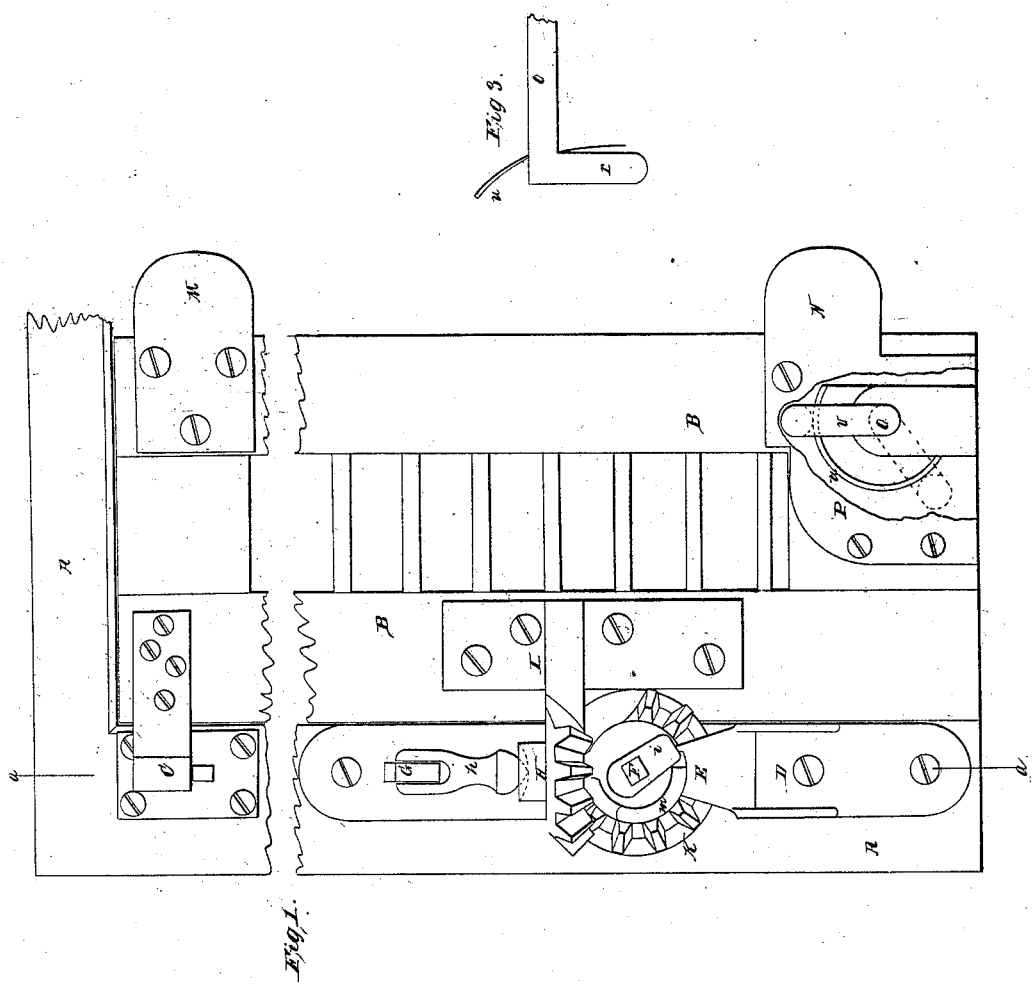

Nº 80,023. Patented July 14, 1868.

Witnesses.
Wm H Bishop
A. De Lacy.

Inventor.
Thos J Sloan

United States Patent Office.

THOMAS J. SLOAN, OF NEW YORK, N. Y.

Letters Patent No. 80,023, dated July 14, 1868.

IMPROVEMENT IN MODE OF OPERATING SHUTTERS.

The Schedule referred to in these Letters Patent and making part of the same.

TO ALL WHOM IT MAY CONCERN:

Be it known that I, THOMAS J. SLOAN, of New York, of New York county, in the State of New York, have invented certain new and useful Improvements in Apparatus for Opening and Closing Window-Blinds; and I do hereby declare that the following is a full and exact description thereof, reference being had to the accompanying drawings, making part of this application.

My invention relates to devices for opening and closing outside shutters and locking them.

Previous to my invention numerous devices have been suggested for effecting, from within the window, the opening and closing of outside shutters of windows, and such devices as have been made to retain or hold the shutter in its opened and closed positions.

My present invention relates, in the first place, to a novel means or device for opening and closing the blind; secondly, to the application, in connection with an opening and closing-mechanism, of a positive lock-mechanism, which can be worked without opening the window.

It is all-important, in the use of any opening and closing-device, designed to avoid the necessity of opening and closing the window, to provide some preventive to the shutters becoming deranged and wedged together, since, when such occurrence takes place, no mechanism for opening the blind will effect that desired end; and it is often necessary to positively lock the blinds, and is always desirable to draw them, when closed, tight home, so as to keep the blinds true, and in good order.

The first part of my invention consists in a novel mechanism for opening and closing and retaining the shutter without opening the window, composed of geared hinge-sectors, a spring-shaft, arranged to slide and rotate, and a retaining-device, all as hereinafter more fully described.

And my invention further consists in the employment, in connection with a device for opening and closing the shutter from within the window, of a lock-mechanism, which is operated also from within the window, as will be presently explained.

And my invention further consists in the application of overlapping lips or a strip, so made and arranged as to effectually prevent the blinds becoming deranged or stuck together, as will be more fully explained hereinafter.

To enable those skilled in the art to make and use my invention, I will proceed to describe the construction and operation of the several features of my invention, referring by letters to the accompanying drawings, making part of my application, and in which—

Figure 1 is a front or face view of a window and outside shutter, (with the shutter closed,) embracing my invention.

Figure 2 is a vertical section at line $a$ $a$, fig. 1.

Figure 3 is a detail view of lock-device.

Figure 4 is a cross-section at $b$ $b$, fig. 2.

In the several figures the same parts are designated by the same letters of reference.

Figure 6:
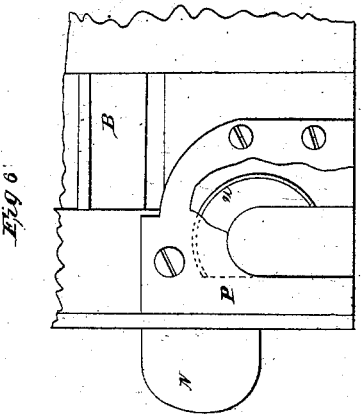
Figure 6 is a detail view, showing inside of shutter and the lock-plate.
Figure 5:
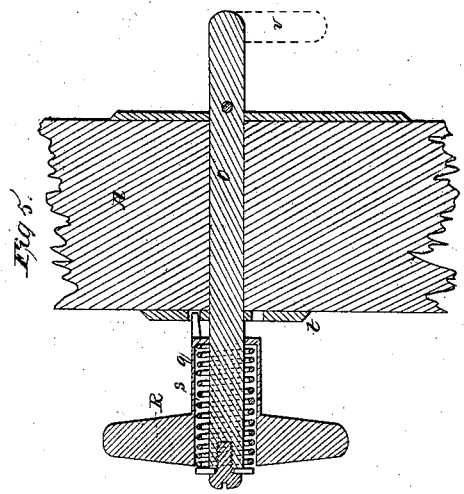
Figure 5 is a horizontal section through the frame, showing the lock-device.

A is the window-frame, and B an ordinary outside blind or shutter, hung to the frame by a common hinge, C, at the top, and near the bottom hung on one of my improved hinge-devices, as clearly shown in the drawings.

D is a metallic stand, bolted to the outside of the window-frame, and formed with an arm, E, in which is formed a bearing for the outer end of shaft F, and also with an arm, G, in which is hung a pendant, $h$, designed to retain the blind on its hinges. The upper extremity of arm E forms the support on which is hung and turns the hinge-gear H, the stand I of which is bolted to the shutter, as shown; and the outer side of said arm E, near its top, is formed with a projecting rim, $m$, which operates, together with the cam or button $i$ on shaft F, to effect the retention of the shutter in different positions. Said shaft passes through the window-frame in suitable bearings, is provided with a handle, J, and is arranged, so that it can both rotate and slide longitudinally in its bearings. Said shaft carries on it the driving-gear sector K, and is made square where it passes through the hub of said gear, so that while said gear turns with said shaft, the latter is free to slide longitudinally within the former.

*l* is a spiral spring arranged around the shaft F, in such manner as to continually press the shaft in the direction indicated by the arrow, fig. 2.

The operation of this part of my invention may be thus explained:

When it is desired to open the blind, the shaft F is pressed out longitudinally, as illustrated in red, fig. 2, until the button *i* can rotate past the outer surface of hub or rim *m*, and in contact therewith; it is then rotated by its handle J, which causes the gear K to turn the gear H, and swing open the shutter. When the shutter has been opened, the button *i* passes back into a depression in the rim *m*, and retains the shutter in position, from which it can be released by again pressing out the shaft F, and relieving the rim *m* from the stop-button *i*. The rim *m* may be made, if deemed expedient, with numerous depressions, and the button *i* adapted to catch in each of them, for the purpose of retaining the shutter in any given position.

M and N are metallic lips, fastened to the overlapping shutter, and arranged to lap well over and bear against the outer face of the other half of shutter. The object and advantage of these plates are to prevent the shutter to which they are attached from being drawn or closed in too tight, and cramped with the other shutter, so as to render the opening-device ineffectual. The lower one, N, of these plates serves also as a part of the lock-device, which I will now explain.

O is a shaft or rod, passing horizontally through the sill of the window, and formed with a toe or bend, at right angles, on its outer end, which turns in the lock-plate P. On the inner end of rod or shaft O is arranged, with a feather, a longer collar, *q*, which is provided with a handle, R, and which, while it is free to move longitudinally on said shaft, turns the said shaft with it. Within the said collar *q* is a spiral spring, *s*, which continually presses it towards the window-frame, and the end nearest the frame is provided with a point or projection, which is adapted to pass into either of two holes in the plate *t*, for the purpose of retaining the collar from turning around, and thus preventing the turning from without of the locking-shaft O. Within the lock-plate P is an inclined bearing-plate, *u*, against which the toe *r* of the locking-shaft bears, and by means of which incline the said toe draws the blind home to its bearings, and locks it securely.

It will be seen that when the locking-shaft draws the shutter close and fast, it in turn, by means of its overlapping lip-pieces, draws and holds the other shutter fast home.

When the shaft O is turned to either of its positions, the collar *q* will, by means of its projecting teat passing into the holes in plate *t*, hold it securely in such position.

Having fully explained my improvements, so that one skilled in the art can make and use them, what I claim as new, and desire to secure by Letters Patent, is—

1. The bevel-gears K H, in combination with the spring-shaft F, retaining-button *i*, and rim *m*, when the said shaft is arranged to drive the gear K, and slide longitudinally through it, as and for the purpose set forth.

2. The employment, in connection with a mechanism for opening and closing blinds from the inside of the window, of a positive lock-mechanism, composed of the locking-shaft O *r* and spring-retaining mechanism *q* R *s* *t*, all as specified.

In testimony whereof, I have hereunto set my hand and seal, this 18th day of December, 1867.

THOS. J. SLOAN. [L. S.]

Witnesses:
  WM. H. BISHOP,
  A. DE LACY.